(12) United States Patent
Hirose et al.

(10) Patent No.: US 9,806,371 B2
(45) Date of Patent: *Oct. 31, 2017

(54) ANODE AND BATTERY

(71) Applicant: Sony Corporation, Tokyo (JP)

(72) Inventors: Takakazu Hirose, Fukushima (JP);
Kenichi Kawase, Fukushima (JP);
Isamu Konishiike, Fukushima (JP);
Masayuki Iwama, Fukushima (JP)

(73) Assignee: SONY CORPORATION, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 14/826,832

(22) Filed: Aug. 14, 2015

(65) Prior Publication Data

US 2015/0349340 A1 Dec. 3, 2015

Related U.S. Application Data

(63) Continuation of application No. 11/684,880, filed on Mar. 12, 2007, now Pat. No. 9,112,238.

(30) Foreign Application Priority Data

Mar. 20, 2006 (JP) ................................. 2006-077073

(51) Int. Cl.
*H01M 10/0525* (2010.01)
*H01M 10/04* (2006.01)
(Continued)

(52) U.S. Cl.
CPC ....... *H01M 10/0525* (2013.01); *H01M 2/022* (2013.01); *H01M 2/0222* (2013.01);
(Continued)

(58) Field of Classification Search
None
See application file for complete search history.

(56) References Cited

U.S. PATENT DOCUMENTS 6,051,340 A 4/2000 Kawakami et al.
6,432,579 B1 8/2002 Tsuji et al.
(Continued)

FOREIGN PATENT DOCUMENTS

CN 1400680 3/2003
CN 1422380 A 6/2005
(Continued)

OTHER PUBLICATIONS

Korean Office Examination Report issued in connection with related Korean application No. KR 10-2007-0026531 dated Jul. 19, 2013.
(Continued)

*Primary Examiner* — Melvin C Mayes
*Assistant Examiner* — Michael Forrest
(74) *Attorney, Agent, or Firm* — Dentons US LLP

(57) ABSTRACT

An anode capable of preventing expansion of an anode active material layer and a battery using it are provided. The anode includes an anode current collector, and an anode active material layer containing silicon (Si) as an element, wherein the anode active material layer therein contains at least one selected from the group consisting of a fluoride of an alkali metal and a fluoride of an alkali earth metal.

20 Claims, 6 Drawing Sheets

(51) Int. Cl.
  *H01M 2/02*    (2006.01)
  *H01M 4/13*    (2010.01)
  *H01M 4/04*    (2006.01)
  *H01M 4/139*   (2010.01)
  *H01M 4/58*    (2010.01)
  *H01M 4/485*   (2010.01)
  *H01M 4/02*    (2006.01)
  *H01M 4/131*   (2010.01)

(52) U.S. Cl.
  CPC ......... *H01M 4/0423* (2013.01); *H01M 4/13* (2013.01); *H01M 4/139* (2013.01); *H01M 4/582* (2013.01); *H01M 10/0431* (2013.01); *H01M 4/131* (2013.01); *H01M 4/485* (2013.01); *H01M 2004/021* (2013.01); *H01M 2220/30* (2013.01); *H01M 2300/004* (2013.01); *Y02E 60/122* (2013.01)

(56) References Cited

U.S. PATENT DOCUMENTS

| | | |
|---|---|---|
| 2002/0086213 A1 | 7/2002 | Utsugi et al. |
| 2003/0036000 A1 | 2/2003 | Mori et al. |
| 2003/0148185 A1* | 8/2003 | Kusumoto ............. H01M 4/13 429/233 |
| 2005/0118503 A1 | 6/2005 | Honda et al. |
| 2005/0214646 A1 | 9/2005 | Kubota |
| 2006/0134524 A1* | 6/2006 | Nakai ................. H01M 4/134 429/231.95 |

FOREIGN PATENT DOCUMENTS

| | | |
|---|---|---|
| JP | 08-050922 | 2/1996 |
| JP | 11-135115 | 5/1999 |
| JP | 2948205 | 7/1999 |
| JP | 2004-207210 | 7/2004 |
| JP | 2004-349162 | 12/2004 |

OTHER PUBLICATIONS

Chinese Office Examination Report issued in connection with related Chinese application No. CN 201210417485.5 dated May 6, 2014.

* cited by examiner

ANODE AND BATTERY

CROSS REFERENCES TO RELATED APPLICATIONS

This application is a continuation of U.S. patent application Ser. No. 11/684,880 filed Mar. 12, 2007, now U.S. Pat. No. 9,112,238, the entirety of which is incorporated herein by reference to the extent permitted by law. The present invention contains subject matter related to Japanese Patent Application JP 2006-077073 filed in the Japanese Patent Office on Mar. 20, 2006, the entire contents of which being incorporated herein by reference.

BACKGROUND OF THE INVENTION

1. Field of the Invention

The present invention relates to an anode containing silicon (Si) as an element and a battery using the anode.

2. Description of the Related Art

In recent years, as mobile devices have been sophisticated and multi-functionalized, a higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a vastly high capacity thereof. Therefore, it is considered to use silicon or the like for the anode. In recent years, forming an anode active material layer on an anode current collector by vapor-phase deposition method or the like has been reported (for example, refer to Japanese Unexamined Patent Application Publication Nos. 8-50922 and 11-135115, and Japanese Patent Publication No. 2948205). Silicon or the like is largely expanded and shrunk due to charge and discharge. Thus, there has been a disadvantage that the cycle characteristics are lowered due to pulverization. However, by using vapor-phase deposition method or the like, pulverization can be prevented, and the anode current collector and the anode active material layer can be integrated. In the result, electron conductivity in the anode becomes extremely favorable, and high performance both in the capacity and in the cycle life is expected.

SUMMARY OF THE INVENTION

However, even in the anode in which the anode current collector and the anode active material layer are integrated, when charge and discharge are repeated, the anode active material layer is intensely expanded and shrunk. In the result, for example, the anode active material layer is dropped, and the cycle characteristics are lowered. Further, since the anode active material layer is greatly expanded, the battery is swollen.

In view of the foregoing, in the invention, it is desirable to provide an anode capable of preventing expansion of the anode active material layer and a battery using the anode.

According to an embodiment of the invention, there is provided an anode including an anode current collector and an anode active material layer containing silicon as an element, wherein the anode active material layer therein contains at least one selected from the group consisting of a fluoride of an alkali metal and a fluoride of an alkali earth metal.

According to an embodiment of the invention, there is provided a battery including a cathode, an anode, and an electrolyte, wherein the anode has an anode current collector and an anode active material layer containing silicon as an element, and the anode active material layer therein contains at least one selected from the group consisting of a fluoride of an alkali metal and a fluoride of an alkali earth metal.

According to the anode of the embodiment of the invention, the anode active material layer therein contains at least one selected from the group consisting of the fluoride of the alkali metal and the fluoride of the alkali earth metal. Therefore, expansion of the anode active material layer is prevented to relax the internal stress, and shape deformation of the anode active material layer and separation of the anode active material layer from the anode current collector can be prevented. In addition, even when a new face is exposed due to the expansion of the anode active material layer, it is possible that formation of coat is promoted by the fluoride contained in the anode active material layer, and formation of new coat due to deposition is prevented. Therefore, according to the battery of the embodiment of the invention using the anode, the battery characteristics such as cycle characteristics can be improved, and expansion of the battery can be prevented.

In particular, when a content of the fluoride of the alkali metal in the anode active material layer is within the range from 1 atomic % to 40 atomic % as a total abundance of the alkali metal and fluorine, or when a content of the fluoride of the alkali earth metal in the anode active material layer is within the range from 0.5 atomic % to 30 atomic % as a total abundance of the alkali earth metal and fluorine, higher effects can be obtained.

Further, when the anode active material layer further contains oxygen (O) within the range from 3 atomic % to 40 atomic %, or when the anode active material layer has a lamination structure in which a first layer and a second layer with different contents of oxygen are alternately layered, expansion of the anode active material layer can be further prevented.

When the anode active material layer further contains at least one metal element selected from the group consisting of iron (Fe), cobalt (Co), nickel (Ni), and titanium (Ti), increase in resistance due to addition of the fluoride can be prevented.

Other and further objects, features and advantages of the invention will appear more fully from the following description.

DETAILED DESCRIPTION OF THE PREFERRED EMBODIMENTS

Embodiments of the invention will be hereinafter described in detail with reference to the drawings.

First Embodiment

Figure 1:
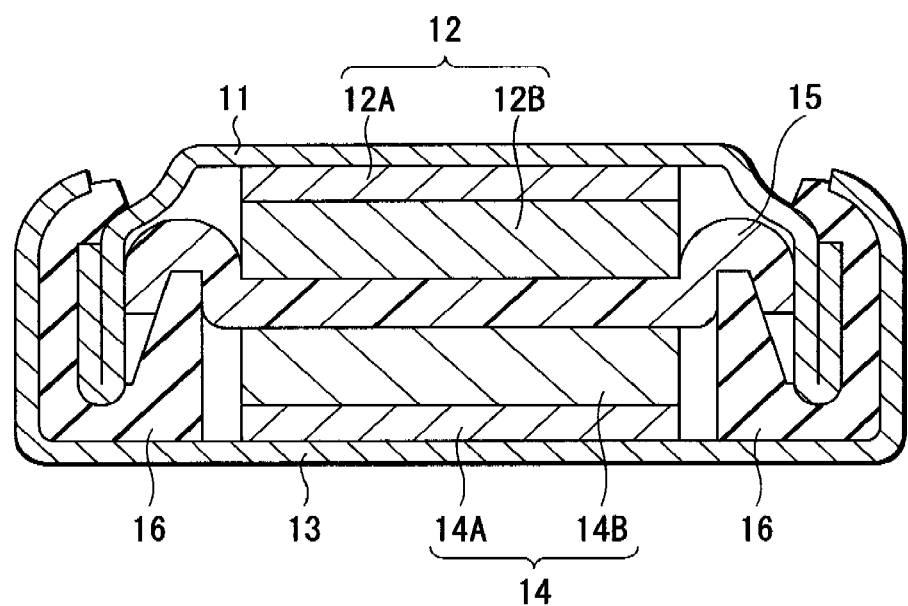
FIG. 1 is a cross section showing a structure of a secondary battery according to a first embodiment of the invention.

FIG. 1 shows a structure of a secondary battery according to a first embodiment of the invention. The secondary battery is a so-called coin-type secondary battery. In the secondary battery, an anode 12 contained in a package cup 11 and a cathode 14 contained in a package can 13 are layered with a separator 15 in between. An electrolytic solution as a liquid electrolyte is impregnated in the separator 15. Peripheral edges of the package cup 11 and the package can 13 are hermetically sealed by being caulked with an insulating gasket 16. The package cup 11 and the package can 13 are respectively made of a metal such as stainless and aluminum (Al).

The anode 12 has, for example, an anode current collector 12A and an anode active material layer 12B provided on the anode current collector 12A.

The anode current collector 12A is preferably made of a metal material containing at least one metal element not forming an intermetallic compound with lithium (Li). When an intermetallic compound is formed with lithium, the anode is expanded and shrunk due to charge and discharge, structure is destroyed, and current collectivity is lowered. In addition, the ability to support the anode active material layer 12B is lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper (Cu), nickel, titanium, iron, or chromium (Cr) can be cited.

Further, the anode current collector 12A preferably contains a metal element being alloyed with the anode active material layer 12B. Thereby, the contact characteristics between the anode active material layer 12B and the anode current collector 12A can be improved. As a metal element not forming an intermetallic compound with lithium and being alloyed with the anode active material layer 12B, in the case that the anode active material layer 12B contains silicon as an element as described later, for example, copper, nickel, or iron can be cited. Such an element is preferable in terms of strength and conductivity.

The anode current collector 12A may include a single layer or a plurality of layers. In the latter case, the layer contacting with the anode active material layer 12B may be made of a metal material being alloyed with silicon, and other layers may be made of other metal material.

The surface of the anode current collector 12A is preferably roughened. The surface roughness Ra thereof is preferably 0.1 μm or more. Thereby, the contact characteristics between the anode active material layer 12B and the anode current collector 12A can be further improved. The surface roughness Ra of the anode current collector 12A is preferably 3.5 μm or less, and more preferably 3.0 μm or less. When the surface roughness Ra is excessively high, there is a possibility that the anode current collector 12A is easily cracked due to expansion of the anode active material layer 12B. The surface roughness Ra means the arithmetic average roughness Ra specified in JIS B0601. It is enough that the surface roughness Ra of at least the region of the anode current collector 12A where the anode active material layer 12B is provided is within the foregoing range.

The anode active material layer 12B contains silicon as an element. Silicon has a high ability to insert and extract lithium, and provides the high energy density. Silicon may be contained in the form of a simple substance, an alloy, or a compound.

Further, the anode active material layer 12B therein contains at least one selected from the group consisting of an alkali metal fluoride and an alkali earth metal fluoride. Thereby, expansion of the anode active material layer 12B is prevented and the internal stress can be relaxed. In addition, even when a new face is exposed due to the expansion, it is possible that formation of coat is promoted by the fluoride contained inside, and formation of new coat deposited by a decomposition product of an electrolytic solution or the like is prevented.

As the alkali metal fluoride, for example, lithium fluoride, sodium fluoride, or potassium fluoride can be cited. As the alkali earth metal fluoride, for example, magnesium fluoride, calcium fluoride, strontium fluoride, or barium fluoride can be cited. The content of the alkali metal fluoride in the anode active material layer 12B is preferably within the range from 1 atomic % to 40 atomic % as the total abundance of an alkali metal and fluorine. The content of the alkali earth metal fluoride in the anode active material layer 12B is preferably within the range from 0.5 atomic % to 30 atomic % as the total abundance of an alkali earth metal and fluorine. When the fluoride content is small, sufficient effects are not able to be obtained. When the fluoride content is large, the contact characteristics of the anode active material layer 12B are lowered and the silicon content becomes small, leading to the lowered capacity.

The anode active material layer 12B preferably further contains oxygen as an element. Thereby, the anode active material layer 12B is further prevented from being expanded. At least part of the oxygen contained in the anode active material layer 12B is preferably bonded to silicon. The bonding state may be in a state of silicon oxide, silicon dioxide, or other metastable state. The oxygen content in the anode active material layer 12B is preferably within the range from 3 atomic % to 40 atomic %. When the oxygen content is smaller than the foregoing value, sufficient effects are not able to be obtained. When the oxygen content is larger than the foregoing value, the capacity is lowered, the resistance value of the anode active material layer 12B is increased, and thus the anode is swollen by local lithium insertion, and the cycle characteristics are lowered. The anode active material layer 12B does not include the coat formed on the surface of the anode active material layer 12B by decomposition of the electrolytic solution or the like by charge and discharge. Therefore, when the oxygen content in the anode active material layer 12B is calculated, oxygen contained in such a coat is not included in the calculation.

It is preferable that in the anode active material layer 12B, a first layer with the smaller oxygen content and a second layer with the oxygen content larger than that of the first layer are alternately layered. At least one or more second layers preferably exist between the first layers. Thereby, expansion and shrinkage due to charge and discharge can be more effectively prevented. For example, the silicon content in the first layer is preferably 90 atomic % or more. It is possible that oxygen is contained or not contained therein. The oxygen content is preferably small as long as possible. It is more preferable that no oxygen is contained, and thus the oxygen content is 0. Thereby, the higher capacity can be obtained. Meanwhile, the silicon content in the second layer is preferably 90 atomic % or less, and the oxygen content in the second layer is preferably 10 atomic % or more. Thereby, structural deformation due to expansion and shrinkage can be more effectively prevented. The first layer and the second layer may be layered in the order of the first layer and the second layer from the anode current collector 12A side. Otherwise, the first layer and the second layer may be layered in the order of the second layer and the first layer. The surface layer may be the first layer or the second layer. The oxygen content is preferably changed incrementally or continuously between the first layer and the second layer. When the oxygen content is changed rapidly, the diffusion of lithium ions is lowered and the resistance is increased in some cases.

The anode active material layer 12B preferably further contains at least one metal element selected from the group consisting of iron, cobalt, nickel, and titanium as an element. When the fluoride is added to the anode active material layer 12B, the resistance value is increased. However, by adding the foregoing metal element, the resistance value can be lowered. The total content of metal elements in the anode active material layer 12B is preferably from 0.5 atomic % to 30 atomic %. When the content is small, it is difficult to obtain sufficient effects. Meanwhile, when the content is large, the silicon content becomes small, and thus the content is lowered.

Figure 2:
FIG. 2 is an SEM photograph showing a particle structure of an anode active material layer according to the secondary battery shown in FIG. 1.
Figure 3:
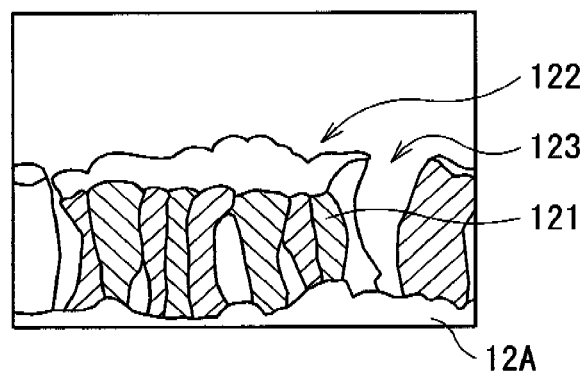
FIG. 3 is a schematic view showing the particle structure of the anode active material layer according to the secondary battery shown in FIG. 1.

At least part of the anode active material layer 12B is preferably formed by, for example, vapor-phase deposition method. FIG. 2 is a Scanning Electron Microscope (SEM) photograph showing a particle structure of the anode active material layer 12B in a cross section in the thickness direction. FIG. 3 is a view schematically showing the particle structure. The anode active material layer 12B is formed, for example, by growing in the thickness direction. The anode active material layer 12B has a plurality of active material particles 121 containing silicon as an element. At least some of the active material particles 121 preferably contain the foregoing fluoride in the particle. Thereby, higher effects can be obtained. Further, the active material particles 121 form a plurality of secondary particle 122 by gathering themselves. In each secondary particle 122, each active material particle 121 is not simply adjacent to each other, but jointed each other at least in part. Each secondary particle 122 is formed by, for example, charge and discharge, and separated by a groove 123. The groove 123 almost reaches the anode current collector 12A.

The anode active material layer 12B is preferably alloyed with the interface with the anode current collector 12A at least in part. Specifically, it is preferable that the element of the anode current collector 12A is diffused in the anode active material layer 12B, or the element of the anode active material layer 12B is diffused in the anode current collector 12A, or the both elements are diffused in each other. Thereby, even when the anode active material layer 12B is expanded and shrunk by charge and discharge, the anode active material layer 12B can be prevented from being dropped from the anode current collector 12A.

The cathode 14 has, for example, a cathode current collector 14A and a cathode active material layer 14B provided on the cathode current collector 14A. Arrangement is made so that the cathode active material layer 14B side faces the anode active material layer 12B. The cathode current collector 14A is made of, for example, aluminum, nickel, and stainless.

The cathode active material layer 14B contains, for example, as a cathode active material, one or more cathode materials capable of inserting and extracting lithium. The cathode active material layer 14B may contain an electrical conductor such as a carbon material and a binder such as polyvinylidene fluoride according to needs. As a cathode material capable of inserting and extracting lithium, for example, a lithium complex oxide expressed by a general formula, $Li_xMIO_2$ is preferable, since thereby the high voltage can be generated, and the higher capacity of the secondary battery can be obtained due to its high density. In the formula, M represents one or more transition metals, and, for example, preferably includes at least one of cobalt and nickel. x varies according to the charge and discharge state of the battery, and is generally in the range of $0.05 \leq x \leq 1.10$. As a specific example of such a lithium complex oxide, $LiCoO_2$, $LiNiO_2$ or the like can be cited.

The separator 15 separates the anode 12 from the cathode 14, prevents current short circuit due to contact of the both electrodes, and lets through the lithium ions. The separator 15 is made of, for example, polyethylene or polypropylene.

An electrolytic solution impregnated in the separator 15 contains, for example, a solvent and an electrolyte salt. The electrolytic solution may contain an additive according to needs. As a solvent, for example, a nonaqueous solvent such as ethylene carbonate, propylene carbonate, dimethyl carbonate, diethyl carbonate, and ethyl methyl carbonate can be cited. One of the solvents may be used singly, or a mixture of two or more solvents may be used.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be fabricated as follows, for example.

First, the anode active material layer 12B containing silicon as an element is formed on the anode current collector 12A by, for example, vapor-phase deposition method. As vapor-phase deposition method, for example, physical deposition method or chemical deposition method can be cited. Specifically, any of vacuum vapor deposition method, sputtering method, ion plating method, laser ablation method, CVD (Chemical Vapor Deposition) method, spraying method and the like can be used. Then, for example, by co-depositing the foregoing fluoride together with silicon, or by alternatively layering a layer containing silicon and a layer containing the foregoing fluoride, the fluoride is added to the anode active material layer 12B.

When the co-deposition is used, resistance heating method or electron beam method may be used. The method for the silicon raw material may be different from the method for the fluoride raw material. When the layer containing silicon and the layer containing the fluoride are alternately layered, each film forming method may be the same or different. However, to further uniform the film thickness distribution of the layer containing the fluoride, the fluoride raw material is preferably arranged being divided in two or more around the silicon raw material. For the silicon material, for example, any of silicon single substance, a silicon alloy, and a silicon compound may be used. The silicon raw material is selected according to the composition of the anode active material layer 12B to be formed. For the fluoride raw material, for example, the fluoride to be added is directly used. When oxygen is added to the anode active material layer 12B, for example, oxygen gas may be introduced in the film forming atmosphere. When iron, cobalt, nickel, or titanium is added to the anode active material layer 12B, for example, such elements may be co-deposited, or a layer containing such an element may be inserted, or a silicon alloy or a silicon compound containing such an element may be used as a raw material.

After the anode active material layer 12B is formed, heat treatment is performed under the vacuum atmosphere or under the non-oxidizing atmosphere if necessary. In some cases, the anode active material layer 12B and the anode current collector 12A are alloyed concurrently when the anode active material layer 12B is formed. However, by performing heat treatment, alloying can be more promoted. In particular, when the layer containing silicon and the layer containing the fluoride are alternately layered, the elements in the layers are preferably diffused in each other by performing heat treatment.

Next, the cathode active material layer 14B is formed on the cathode current collector 14A. For example, a cathode active material, and if necessary an electrical conductor and a binder are mixed, the cathode current collector 14A is coated with the resultant mixture, and the result is compression-molded to form the cathode. Subsequently, the anode 12, the separator 15, and the cathode 14 are layered, the lamination is inserted in the package cup 11 and the package can 13, an electrolytic solution is injected therein, and the resultant is caulked to assemble the battery. After the battery is assembled, for example, by performing charge and discharge, the groove 123 is formed in the anode active material layer 12B, and the anode active material layer 12B is divided into the secondary particles 122 in which the plurality of active material particles 121 are gathered. Thereby, the secondary battery shown in FIG. 1 is obtained.

In the secondary battery, when charged, for example, lithium ions are extracted from the cathode 14 and inserted in the anode 12 through the electrolytic solution. When discharged, for example, lithium ions are extracted from the anode 12 and inserted in the cathode 14 through the electrolytic solution. Along with the charge and discharge, the anode active material layer 12B is largely expanded and shrunk. However, the expansion is prevented by the fluoride contained inside, and thus the stress is relaxed. Further, along with the expansion, a new face is exposed on the anode active material layer 12B. However, formation of coat is promoted by the fluoride contained inside, while formation of coat deposited by decomposition of the electrolytic solution is prevented.

As above, according to this embodiment, the anode active material layer 12B contains at least one selected from the group consisting of the alkali metal fluoride and the alkali earth metal fluoride. Therefore, expansion of the anode active material layer 12B is prevented and the internal stress can be relaxed, and shape deformation of the anode active material layer 12B and separation of the anode active material layer 12B from the anode current collector 12A can be prevented. In addition, even when a new face is exposed due to the expansion of the anode active material layer 12B, it is possible that formation of coat is promoted by the fluoride contained in the anode active material layer 12B, and formation of new coat deposited by decomposition of the electrolytic solution or the like is prevented. Therefore, the battery characteristics such as cycle characteristics can be improved, and expansion of the battery can be prevented.

In particular, when the content of the alkali metal fluoride in the anode active material layer 12B is within the range from 1 atomic % to 40 atomic % as the total abundance of the alkali metal and fluorine, or when the content of the alkali earth metal fluoride in the anode active material layer 12B is within the range from 0.5 atomic % to 30 atomic % as the total abundance of the alkali earth metal and fluorine, higher effects can be obtained.

Further, when the anode active material layer 12B contains oxygen within the range from 3 atomic % to 40 atomic %, or when the first layer and the second layer with the oxygen content different from each other are alternately layered in the anode active material layer 12B, expansion of the anode active material layer 12B can be further prevented.

When the anode active material layer 12B further contains at least one metal element selected from the group consisting of iron, cobalt, nickel, and titanium, increase in resistance due to addition of the fluoride can be prevented.

Second Embodiment

Figure 4:
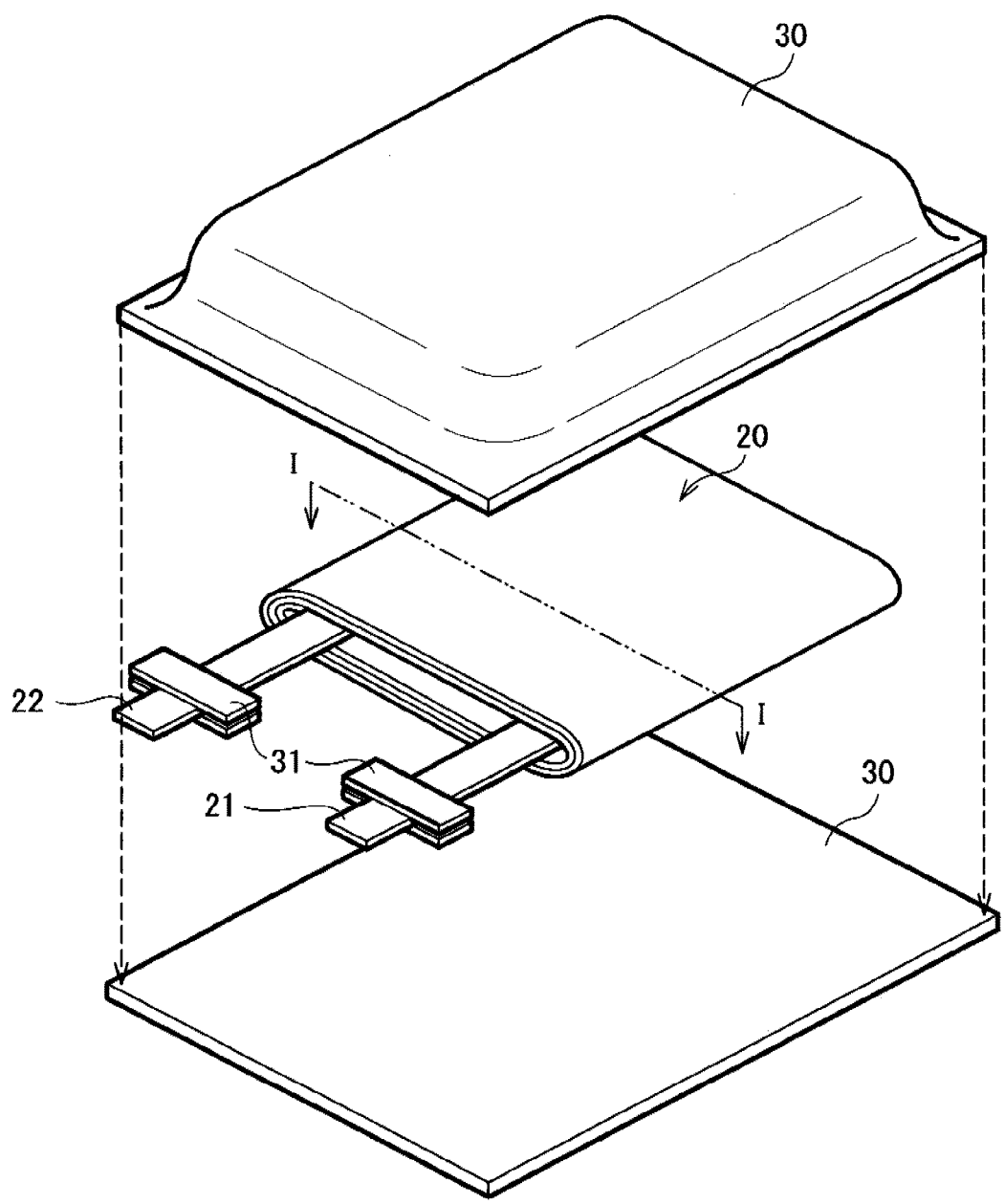
FIG. 4 is an exploded perspective view showing a structure of a secondary battery according to a second embodiment of the invention.

FIG. 4 shows a structure of a secondary battery according to a second embodiment of the invention. In the secondary battery, a spirally wound electrode body 20 on which leads 21 and 22 are attached is contained inside a film package member 30. Thereby, a small, light, and thin secondary battery can be obtained.

The leads 21 and 22 are respectively directed from inside to outside of the package member 30 and derived in the same direction, for example. The leads 21 and 22 are respectively made of, for example, a metal material such as aluminum, copper, nickel, and stainless, and are in a state of a thin plate or mesh, respectively.

The package member 30 is made of a rectangular aluminum laminated film in which, for example, a nylon film, an aluminum foil, and a polyethylene film are bonded together in this order. The package member 30 is, for example, arranged so that the polyethylene film side and the spirally wound electrode body 20 face each other, and the respective outer edges are contacted to each other by fusion bonding or an adhesive. Adhesive films 31 to protect from entering of outside air are inserted between the package member 30 and the leads 21 and 22. The adhesive film 31 is made of a material having contact characteristics to the leads 21 and 22, for example, a polyolefin resin such as polyethylene, polypropylene, modified polyethylene, and modified polypropylene.

The package member 30 may be made of a laminated film having other structure, a polymer film such as polypropylene, or a metal film, instead of the foregoing aluminum laminated film.

Figure 5:
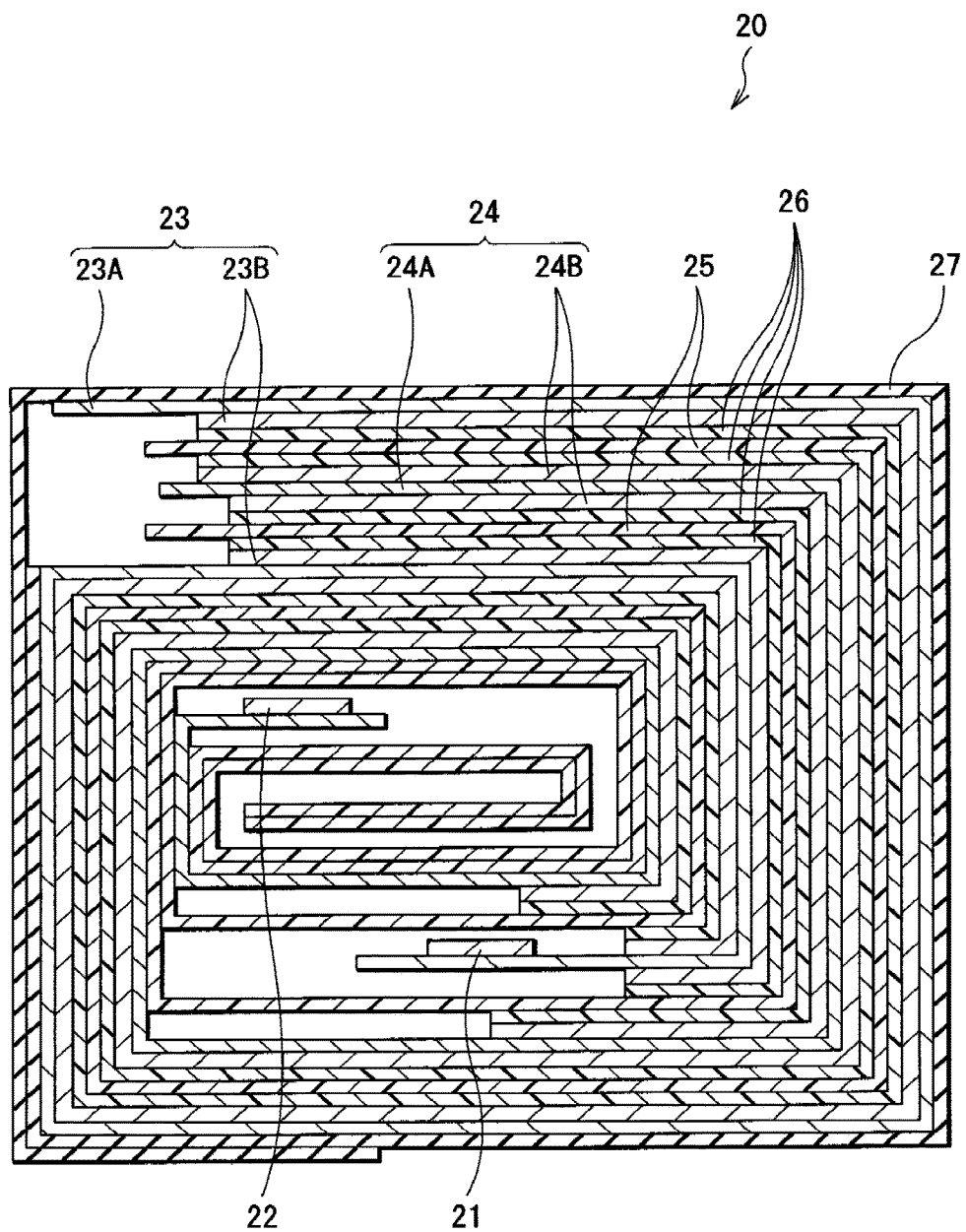
FIG. 5 is a cross section showing a structure taken along line I-I of the secondary battery shown in FIG. 4.

FIG. 5 shows a cross sectional structure taken along line I-I of the spirally wound electrode body 20 shown in FIG. 4. In the spirally wound electrode body 20, an anode 23 and a cathode 24 are layered and spirally wound with a separator 25 and an electrolyte layer 26 in between. The outermost periphery thereof is protected by a protective tape 27.

The anode 23 has a structure in which an anode active material layer 23B is provided on the both faces of an anode current collector 23A. The cathode 24 also has a structure in which a cathode active material layer 24B is provided on the both faces of a cathode current collector 24A. Arrangement is made so that the cathode active material layer 24B faces the anode active material layer 23B. The structures of the anode current collector 23A, the anode active material layer 23B, the cathode current collector 24A, the cathode active material layer 24B, and the separator 25 are similar to those of the anode current collector 12A, the anode active material layer 12B, the cathode current collector 14A, the cathode active material layer 14B, and the separator 15 respectively described above. The particle structure of the anode active material layer 23B is determined at, for example, the central portion of the spirally wound electrode body 20 where the curvature is not large.

The electrolyte layer 26 is made of a so-called gelatinous electrolyte in which an electrolytic solution is held in a holding body formed of a polymer. The gelatinous electrolyte is preferable, since the high ion conductivity can be thereby obtained, and leakage of the battery can be thereby prevented. The composition of the electrolytic solution is similar to that of the first embodiment. As a polymer material, for example, polyvinylidene fluoride can be cited.

The secondary battery can be manufactured, for example, as follows.

First, the anode 23 and the cathode 24 are formed similarly to in the first embodiment. After that, the electrolyte layer 26 in which an electrolytic solution is held in a holding body is formed on the anode 23 and the cathode 24, respectively. Next, the leads 21 and 22 are attached to the anode current collector 23A and the cathode current collector 24A. Subsequently, the anode 23 and the cathode 24 formed with the electrolyte layer 26 are layered and spirally wound with the separator 25 in between. The protective tape 27 is adhered to the outermost periphery thereof to form the spirally wound electrode body 20. After that, for example, the spirally wound electrode body 20 is sandwiched between the package members 30, and outer edges of the package members 30 are contacted by thermal fusion bonding or the like to enclose the spirally wound electrode body 20. Then, the adhesive films 31 are inserted between the leads 21 and 22 and the package member 30.

Otherwise, the secondary battery may be assembled as follows. First, the anode 23 and the cathode 24 are formed similarly to in the first embodiment. After that, the leads 21 and 22 are attached thereto. Next, the anode 23 and the cathode 24 are layered and spirally wound with the separator 25 in between. The protective tape 27 is adhered to the outermost periphery thereof, and a spirally wound body as a precursor of the spirally wound electrode body 20 is formed. Subsequently, the spirally wound body is sandwiched between the package members 30, and the outermost peripheries except for one side are thermally fusion-bonded to obtain a pouched state. After that, an electrolytic composition containing an electrolytic solution, a monomer as a raw material for a polymer, a polymerization initiator, and if necessary other material such as a polymerization inhibitor is injected inside the package member 30. After that, the opening of the package member 30 is thermally fusion-bonded and hermetically sealed in the vacuum atmosphere. Then, the resultant is heated to polymerize the monomer to obtain a polymer. Thereby, the gelatinous electrolyte layer 26 is formed.

After the battery is assembled as above, as in the first embodiment, for example, by performing charge and discharge, the groove 123 and the secondary particle 122 are formed in the anode active material layer 23B.

The secondary battery operates similarly to the secondary battery in the first embodiment, and has effects similar to those of the secondary battery in the first embodiment.

EXAMPLES

Further, specific examples of the invention will be hereinafter described in detail with reference to the drawings.

Examples 1-1 to 1-11

The secondary battery having the structure shown in FIGS. 4 and 5 was fabricated. First, silicon and an alkali metal fluoride were co-deposited by vacuum deposition method on the anode current collector 23A made of a copper foil with the surface roughened and being 12 μm thick to form the anode active material layer 23B being about 5 μm thick. As the alkali metal fluoride, lithium fluoride was used in Examples 1-1 to 1-5, sodium fluoride was used in Examples 1-6 to 1-8, and potassium fluoride was used in Examples 1-9 to 1-11. The deposition amount of the fluoride was adjusted in Examples 1-1 to 1-11, and thereby the fluoride content in the anode active material layer 23B was changed. Next, heat treatment was performed in the reduced pressure atmosphere.

Figure 6:
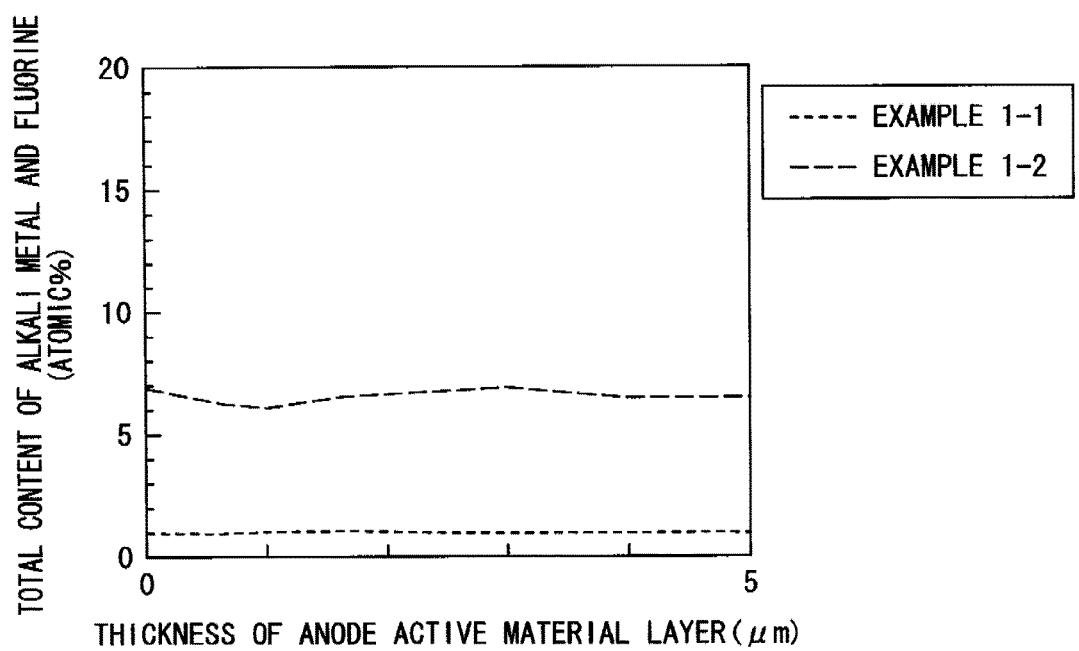
FIG. 6 shows the total contents of an alkali metal and fluorine by ESCA in Example 1-1 and Example 1-2.

For the formed anode 23 of Examples 1-1 to 1-11, a cross section in the thickness direction was cut out by Focused Ion Beam (FIB). After that, the cut-out cross section was observed by SEM. It was confirmed that in all cases, the plurality of active material particles 121 were grown in the thickness direction. Further, the cut-out cross section was provided with local element analysis by Auger Electron Spectroscopy (AES). In the result, it was confirmed that in all cases, the anode active material layer 23B and the anode current collector 23A were alloyed at least in part. Further, the cut-out cross section was provided with line analysis by AES and analysis by Electron Spectroscopy for Chemical Analysis (ESCA). In the result, it was confirmed that the alkali metal fluoride existed inside the anode active material layer 23. In addition, the fluoride content in the anode active material layer 23 was examined by the foregoing analysis. The obtained results are shown in Table 1 and FIG. 6. FIG. 6 is the analysis results of the total content of the alkali metal and fluorine by ESCA in Example 1-1 and Example 1-2.

Further, 92 parts by weight of lithium cobaltate ($LiCoO_2$) powder being 5 μm in the average particle diameter as a cathode active material, 3 parts by weight of carbon black as an electrical conductor, and 5 parts by weight of polyvinylidene fluoride as a binder were mixed. The resultant mixture was put in N-methyl-2-pyrrolidone as a disperse medium to obtain slurry. Next, the cathode current collector 24A made of an aluminum foil being 15 μm thick was coated with the slurry, which was dried and pressed to form the cathode active material layer 24B.

Subsequently, 37.5 wt % of ethylene carbonate, 37.5 wt % of propylene carbonate, 10 wt % of vinylene carbonate, and 15 wt % of $LiPF_6$ were mixed to prepare an electrolytic solution. The both faces of the anode 23 and the cathode 24 were respectively coated with a mixture obtained by mixing 30 parts by weight of the electrolytic solution and 10 parts by weight of polyvinylidene fluoride as a block copolymer with 0.6 million of the weight average molecular weight to form the electrolyte layer 26. After that, the leads 21 and 22 were attached, the anode 23 and the cathode 24 were layered and spirally wound with the separator 25 in between, and the resultant body was enclosed in the package member 30 made of an aluminum laminated film. Thereby, the secondary battery was assembled.

As Comparative example 1-1 relative to Examples 1-1 to 1-11, a secondary battery was assembled in the same manner as in Examples 1-1 to 1-11, except that the fluoride was not co-deposited when the anode active material layer was formed. Further, as Comparative examples 1-2 to 1-4, secondary batteries were assembled in the same manner as in Examples 1-1 to 1-11, except that when the anode active material layer was formed, the fluoride was not co-deposited, and a lithium fluoride layer was formed by vacuum vapor deposition method on the surface of the anode active material layer. The thickness of the lithium fluoride layer was changed as 130 nm in Comparative example 1-2, 350 nm in Comparative example 1-3, and 640 nm in Comparative example 1-4.

For the fabricated secondary batteries of Examples 1-1 to 1-11 and Comparative examples 1-1 to 1-4, charge and discharge test was performed at 25 deg C., and the capacity retention ratio at the 31st cycle to the second cycle was obtained. At that time, charge was performed until the battery voltage reached 4.2 V at the constant current density of 1 mA/cm², and then performed until the current density reached 0.05 mA/cm² at the constant voltage of 4.2 V. Discharge was performed until the battery voltage reached 2.5 V at the constant current density of 1 mA/cm². Charge was performed so that the utility ratio of the capacity of the anode 23 became 85% to prevent metal lithium from being precipitated on the anode 23. The capacity retention ratio was calculated as the ratio of the discharge capacity at the 31st cycle to the discharge capacity at the second cycle, that is, as (the discharge capacity at the 31st cycle/the discharge capacity at the second cycle)×100.

Further, for the fabricated secondary batteries of Examples 1-1 to 1-11 and Comparative examples 1-1 to 1-4, the thickness of the batteries was measured before performing charge and discharge and after performing the 31st charge and discharge. Then, the expansion ratio after the 31st cycle was examined. The expansion ratio was calculated as the ratio of the thickness after the 31st cycle to the thickness before charge and discharge, that is, as (the thickness after the 31st cycle/the thickness before charge and discharge). The obtained result is shown in Table 1.

Further, for the secondary batteries of Examples 1-1 to 1-11, the battery was disassembled after the 31st cycle, the anode 23 in a discharged state was taken out, and a cross section in the thickness direction at the central portion of the anode 23 was observed by SEM. It was confirmed that in the all cases, as shown in FIGS. 2 and 3, the plurality of active material particles 121 gathered to form the secondary particle 122.

TABLE 1

| | | Fluoride | | | |
|---|---|---|---|---|---|
| | Position | Kind | Alkali metal + fluorine (atomic %) | Capacity retention ratio (%) | Expansion ratio (times) |
| Example 1-1 | Inside | Lithium fluoride | 1.02 | 85 | 1.1 |
| Example 1-2 | | | 6.5 | 89 | 1.09 |
| Example 1-3 | | | 17.4 | 92 | 1.06 |
| Example 1-4 | | | 32.1 | 90 | 1.04 |
| Example 1-5 | | | 39.7 | 90 | 1.02 |
| Example 1-6 | Inside | Sodium fluoride | 2.54 | 84 | 1.09 |
| Example 1-7 | | | 24.3 | 89 | 1.05 |
| Example 1-8 | | | 34.2 | 86 | 1.04 |
| Example 1-9 | Inside | Potassium fluoride | 5.2 | 83 | 1.08 |
| Example 1-10 | | | 20.1 | 88 | 1.06 |
| Example 1-11 | | | 30.2 | 88 | 1.05 |
| Comparative example 1-1 | — | — | — | 70 | 1.14 |
| Comparative example 1-2 | Surface | Lithium fluoride | (130 m) | 82 | 1.13 |
| Comparative example 1-3 | | | (350 nm) | 83 | 1.12 |
| Comparative example 1-4 | | | (640 nm) | 84 | 1.12 |

As shown in Table 1, according to Examples 1-1 to 1-11, the capacity retention ratio was improved and the swollenness was smaller compared to in Comparative examples 1-1 to 1-4. That is, it was found that when the alkali metal fluoride was contained inside the anode active material layer 23B, the internal stress due to charge and discharge could be relaxed, the battery characteristics such as cycle characteristics could be improved, and the swollenness of the battery could be prevented.

Further, from the results of Examples 1-1 to 1-11, there was a tendency that when the fluoride content was increased, the expansion ratio was further decreased, while the capacity retention ratio was once increased and then decreased. That is, it was found that the content of the alkali metal fluoride in the anode active material layer 23B was preferably within the range from 1 atomic % to 40 atomic % as the total abundance of the alkali metal and fluorine.

Examples 2-1 to 2-14

Secondary batteries were assembled in the same manner as in Examples 1-1 to 1-11, except that when the anode active material layer 23B was formed, an alkali earth metal fluoride was co-deposited instead of the alkali metal fluoride. As the alkali earth metal fluoride, magnesium fluoride was used in Examples 2-1 to 2-4, calcium fluoride was used in Examples 2-5 to 2-7, strontium fluoride was used in Examples 2-8 and 2-9, and barium fluoride was used in Examples 2-10 to 2-14. The deposition amount of the fluoride was adjusted in Examples 2-1 to 2-14, and thereby the fluoride content in the anode active material layer 23B was changed.

Figure 7:
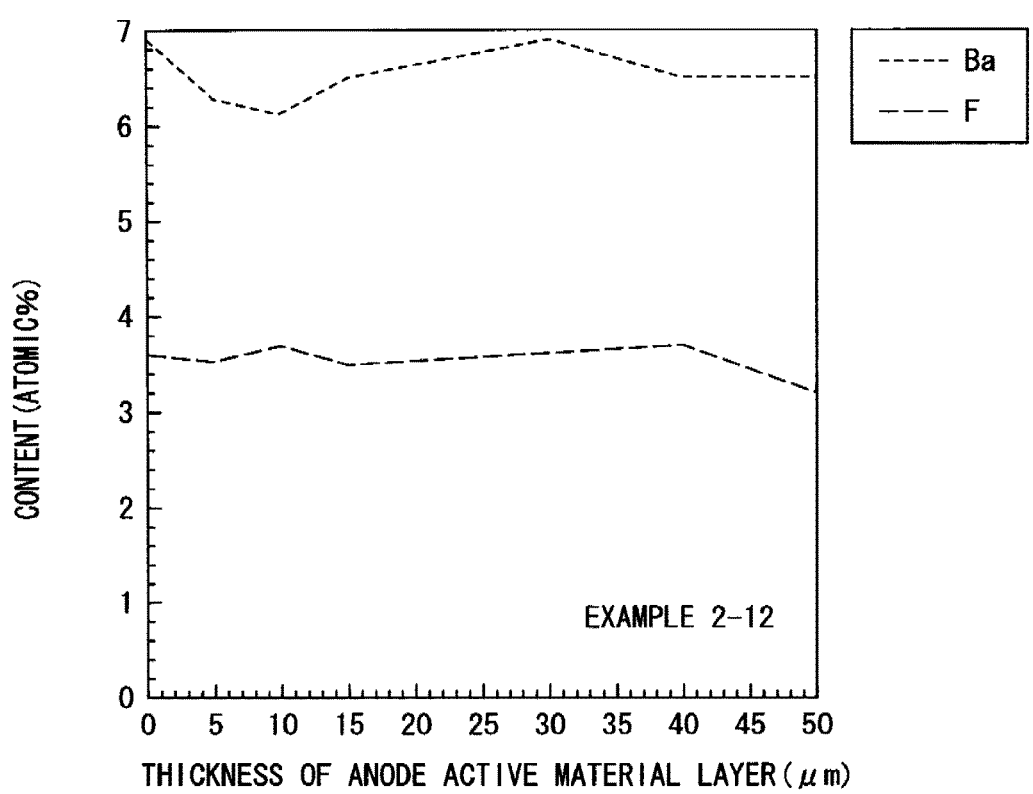
FIG. 7 shows the barium content and the fluorine content by ESCA in Example 2-12.

For the formed anode 23 of Examples 2-1 to 2-14, a cross section in the thickness direction was cut out in the same manner as in Examples 1-1 to 1-11, and the cut-out cross section was observed by SEM, AES, and ESCA. In the result, it was confirmed as well that for the anode 23 of Examples 2-1 to 2-14, the plurality of active material particles 121 were grown in the thickness direction, and the anode active material layer 23B and the anode current collector 23A were alloyed at least in part. Further, it was confirmed that the alkali earth metal fluoride existed inside the anode active material layer 23. The analysis results of the fluoride content in the anode active material layer 23 are shown in Table 2 and FIG. 7. FIG. 7 is the analysis results of the barium content and the fluorine content by ESCA in Example 2-12.

As Comparative examples 2-1 to 2-5 relative to Examples 2-1 to 2-14, secondary batteries were assembled in the same manner as in Examples 2-1 to 2-14, except that when the anode active material layer was formed, the fluoride was not co-deposited, and a magnesium fluoride layer or a barium fluoride layer was formed by vacuum vapor deposition method on the surface of the anode active material layer. In Comparative examples 2-1 and 2-2, the magnesium fluoride layer was formed. The thickness of the magnesium fluoride layer was 200 nm in Comparative Example 2-1, and 640 nm in Comparative example 2-2. In Comparative examples 2-3 to 2-5, the barium fluoride layer was formed. The thickness of the barium fluoride layer was 350 nm in Comparative Example 2-3, 500 nm in Comparative example 2-4, and 720 nm in Comparative example 2-5.

For the fabricated secondary batteries of Examples 2-1 to 2-14 and Comparative examples 2-1 to 2-5, charge and discharge were performed in the same manner as in Examples 1-1 to 1-11, and the capacity retention ratio and the battery expansion ratio were examined. The obtained results are shown in Table 2 together with the result of Comparative example 1-1. Further, when the state of the anode 23 was observed after the 31st cycle in the same manner as in Examples 1-1 to 1-11, it was confirmed that in the all cases, as shown in FIGS. 2 and 3, the plurality of active material particles 121 gathered to form the secondary particle 122.

TABLE 2

| | Position | Kind | Alkali earth metal + fluorine (atomic %) | Capacity retention ratio (%) | Expansion ratio (times) |
|---|---|---|---|---|---|
| | | Fluoride | | | |
| Example 2-1 | Inside | Magnesium fluoride | 0.51 | 87 | 1.09 |
| Example 2-2 | | | 5.43 | 89 | 1.08 |
| Example 2-3 | | | 20.4 | 90 | 1.06 |
| Example 2-4 | | | 27.65 | 89 | 1.04 |
| Example 2-5 | Inside | Calcium fluoride | 4.5 | 88 | 1.1 |
| Example 2-6 | | | 15.3 | 90 | 1.07 |
| Example 2-7 | | | 26.3 | 89 | 1.06 |
| Example 2-8 | Inside | Strontium fluoride | 1.2 | 88 | 1.08 |
| Example 2-9 | | | 10.4 | 89 | 1.05 |
| Example 2-10 | Inside | Barium fluoride | 0.53 | 86 | 1.11 |
| Example 2-11 | | | 6.54 | 89 | 1.07 |
| Example 2-12 | | | 10.8 | 92 | 1.05 |
| Example 2-13 | | | 21.3 | 91 | 1.04 |
| Example 2-14 | | | 29.5 | 89 | 1.03 |
| Comparative example 1-1 | — | — | — | 70 | 1.14 |
| Comparative example 2-1 | Surface | Magnesium fluoride | (200 nm) | 81 | 1.12 |
| Comparative example 2-2 | | | (640 nm) | 80 | 1.13 |
| Comparative example 2-3 | Surface | Barium fluoride | (350 nm) | 82 | 1.12 |
| Comparative example 2-4 | | | (500 nm) | 80 | 1.13 |
| Comparative example 2-5 | | | (720 nm) | 83 | 1.12 |

As shown in Table 2, according to Examples 2-1 to 2-14, the capacity retention ratio was improved and the swollenness was smaller compared to in Comparative examples 1-1 and 2-1 to 2-5. That is, it was found that when the alkali earth metal fluoride was contained inside the anode active material layer 23B, the internal stress due to charge and discharge could be relaxed, the battery characteristics such as cycle characteristics could be improved, and the swollenness of the battery could be prevented as well.

Further, from the results of Examples 2-1 to 2-14, there was a tendency that when the fluoride content was increased, the expansion ratio was further decreased, while the capacity retention ratio was once increased and then decreased. That is, it was found that the content of the alkali earth metal fluoride in the anode active material layer 23B was preferably within the range from 0.5 atomic % to 30 atomic % as the total abundance of the alkali earth metal and fluoride.

Examples 3-1 to 3-6

Secondary batteries were assembled in the same manner as in Examples 1-1 to 1-11, except that when the anode active material layer 23B was formed, a silicon layer and a fluoride layer were alternately layered instead of co-depositing the fluoride. In Examples 3-1 to 3-3, lithium fluoride was used as the fluoride, and the fluoride layer was formed by sputtering method. In Examples 3-4 to 3-6, barium fluoride was used as the fluoride, and the fluoride layer was formed by vacuum vapor deposition method. In all cases, the silicon layer was formed by vacuum vapor deposition method.

Specifically, in Example 3-1, 4 layers of the silicon layer being 1 μm thick and 4 layers of the lithium fluoride layer being 100 nm thick were alternately formed, and finally the silicon layer being 1 μm thick was formed. In Example 3-2, 2 layers of the silicon layer being 2 μm thick and 2 layers of the lithium fluoride layer being 200 nm thick were alternately formed, and finally the silicon layer being 1 μm thick was formed. In Example 3-3, 8 layers of the silicon layer being 0.5 μm thick and 8 layers of the lithium fluoride layer being 50 nm thick were alternately formed, and finally the silicon layer being 1 μm thick was formed. In Example 3-4, 4 layers of the silicon layer being 1 μm thick and 4 layers of the barium fluoride layer being 100 nm thick were alternately formed, and finally the silicon layer being 1 μm thick was formed. In Example 3-5, 2 layers of the silicon layer being 2 μm thick and 2 layers of the barium fluoride layer being 200 nm thick were alternately formed, and finally the silicon layer being 1 μm thick was formed. In Example 3-6, 8 layers of the silicon layer being 0.5 μm thick and 8 layers of the barium fluoride layer being 50 nm thick were alternately formed, and finally the silicon layer being 1 μm thick was formed.

For the formed anode 23 of Examples 3-1 to 3-6, a cross section in the thickness direction was cut out in the same manner as in Examples 1-1 to 1-11, and the cut-out cross section was observed by SEM, AES, and ESCA. In the result, it was confirmed as well that for the anode 23 of Examples 3-1 to 3-6, the plurality of active material particles 121 were grown in the thickness direction, and the anode active material layer 23B and the anode current collector 23A were alloyed at least in part. Further, it was confirmed that the fluoride existed inside the anode active material layer 23.

For the fabricated secondary batteries of Examples 3-1 to 3-6, charge and discharge were performed in the same manner as in Examples 1-1 to 1-11, and the capacity retention ratio and the battery expansion ratio were examined. The obtained results are shown in Table 3 together with the results of Comparative examples 1-1 to 1-4 and 2-3 to 2-5. Further, when the state of the anode 23 was observed after the 31st cycle in the same manner as in Examples 1-1 to 1-11, it was confirmed that in the all cases, as shown in FIGS. 2 and 3, the plurality of active material particles 121 gathered to form the secondary particle 122.

TABLE 3

| | Fluoride layer | | | | Capacity retention ratio (%) | Expansion ratio (times) |
|---|---|---|---|---|---|---|
| | Position | Fluoride | No. of layers | Thickness (nm) | Formation method | | |
| Example 3-1 | Inside | Lithium fluoride | 4 | 100 | Sputtering | 86 | 1.08 |
| Example 3-2 | | | 2 | 200 | | 88 | 1.07 |
| Example 3-3 | | | 8 | 50 | | 89 | 1.08 |
| Example 3-4 | Inside | Barium fluoride | 4 | 100 | deposition | 88 | 1.05 |
| Example 3-5 | | | 2 | 200 | | 90 | 1.04 |

TABLE 3-continued

| | Fluoride layer | | | | Capacity retention ratio (%) | Expansion ratio (times) |
|---|---|---|---|---|---|---|
| | Position | Fluoride | No. of layers | Thickness (nm) | Formation method | | |
| Example 3-6 | | | 8 | 50 | | 89 | 1.05 |
| Comparative example 1-1 | — | — | — | — | — | 70 | 1.14 |
| Comparative example 1-2 | Surface | Lithium fluoride | 1 | 130 | deposition | 82 | 1.13 |
| Comparative example 1-3 | | | 1 | 350 | | 83 | 1.12 |
| Comparative example 1-4 | | | 1 | 640 | | 84 | 1.12 |
| Comparative example 2-3 | Surface | Barium fluoride | 1 | 350 | deposition | 82 | 1.12 |
| Comparative example 2-4 | | | 1 | 500 | | 80 | 1.13 |
| Comparative example 2-5 | | | 1 | 720 | | 83 | 1.12 |

As shown in Table 3, according to Examples 3-1 to 3-6, the capacity retention ratio was improved and the swollenness was smaller compared to in Comparative examples 1-1 to 1-4 and 2-3 to 2-5. That is, it was found that when the alkali metal fluoride or the alkali earth metal fluoride was contained inside the anode active material layer 23B, the battery characteristics such as cycle characteristics could be improved, and the swollenness of the battery could be prevented as well regardless of the forming method of the anode active material layer 23B.

Examples 4-1 to 4-10

Secondary batteries were assembled in the same manner as in Example 1-2 or Example 2-6, except that the surface roughness Ra of the anode current collector 23A was changed within the range from 0.1 μm to 0.5 μm. As the fluoride, lithium fluoride was used in Examples 4-1 to 4-5, and calcium fluoride was used in Examples 4-6 to 4-10. For the formed anode 23 of Examples 4-1 to 4-10, the fluoride content was examined in the same manner as in Examples 1-2 and 2-6. In Examples 4-1 to 4-5, the total abundance of lithium and fluorine was about 6.5 atomic %. In Examples 4-6 to 4-10, the total abundance of calcium and fluorine was about 15.3 atomic %.

For the fabricated secondary batteries of Examples 4-1 to 4-10, charge and discharge were performed in the same manner as in Examples 1-2 and 2-6, and the capacity retention ratio and the battery expansion ratio were examined. The obtained results are shown in Tables 4 and 5.

TABLE 4

| | Surface roughness of anode current collector (Ra) | Fluoride | | Capacity retention ratio (%) |
|---|---|---|---|---|
| | | Kind | Fluorine + lithium (atomic %) | |
| Example 4-1 | 0.1 | Lithium fluoride | 6.5 | 87 |
| Example 4-2 | 0.2 | | | 89 |
| Example 4-3 | 0.3 | | | 91 |
| Example 4-4 | 0.4 | | | 92 |
| Example 4-5 | 0.5 | | | 91 |

TABLE 5

| | Surface roughness of anode current collector (Ra) | Fluoride | | Capacity retention ratio (%) |
|---|---|---|---|---|
| | | Kind | Fluorine + calcium (atomic %) | |
| Example 4-6 | 0.1 | Calcium fluoride | 15.3 | 88 |
| Example 4-7 | 0.2 | | | 90 |
| Example 4-8 | 0.3 | | | 92 |
| Example 4-9 | 0.4 | | | 93 |
| Example 4-10 | 0.5 | | | 91.5 |

As shown in Tables 4 and 5, there was a tendency that as the surface roughness Ra of the anode current collector 23A was increased, the capacity retention ratio was improved. That is, it was found that the surface roughness Ra of the anode current collector 23A was preferably 0.1 μm or more.

Examples 5-1 to 5-6 and 6-1 to 6-6

Secondary batteries were assembled in the same manner as in Example 1-2 or Example 2-6, except that when the anode active material layer 23B was formed, a first layer formed by co-depositing silicon and a fluoride and a second layer of a silicon oxide were alternately layered. In Examples 5-1 to 5-6, the second layer was formed by vacuum vapor deposition method. In Examples 6-1 to 6-6, the second layer was formed by oxidizing the surface of the first layer by introducing oxygen gas. In Examples 5-1 to 5-3 and 6-1 to 6-3, lithium fluoride was used as the fluoride. In Examples 5-4 to 5-6 and 6-4 to 6-6, calcium fluoride was used as the fluoride.

Specifically, in Examples 5-1, 5-4, 6-1, and 6-4, 4 layers of the first layer being 1 μm thick and 4 layers of the second layer being 100 nm thick were alternately formed, and finally the first layer being 1 μm thick was formed. In Examples 5-2 and 5-5, 2 layers of the first layer being 2 μm thick and 2 layers of the second layer being 200 nm thick were alternately formed, and finally the first layer being 1 μm thick was formed. In Examples 5-3 and 5-6, 8 layers of the first layer being 0.5 μm thick and 8 layers of the second layer being 50 nm thick were alternately formed, and finally the first layer being 1 μm thick was formed. For the formed anode 23 of Examples 5-1 to 5-6 and 6-1 to 6-6, the fluoride content was examined in the same manner as in Examples 1-2 and 2-6. In Examples 5-1 to 5-3 and 6-1 to 6-3, the total abundance of lithium and fluorine was about 6.5 atomic %. In Examples 5-4 to 5-6 and 6-4 to 6-6, the total abundance of calcium and fluorine was about 15.3 atomic %.

For the fabricated secondary batteries of Examples 5-1 to 5-6 and 6-1 to 6-6, charge and discharge were performed in the same manner as in Examples 1-2 and 2-6, and the capacity retention ratio and the battery expansion ratio were examined. The obtained results are shown in Tables 6 and 7 together with Examples 1-2 and 2-6.

TABLE 6

|  | Fluoride | Number of second layers | Capacity retention ratio (%) | Expansion ratio (times) |
|---|---|---|---|---|
| Example 1-2 | Lithium fluoride | — | 89 | 1.09 |
| Example 5-1 |  | 4 | 94 | 1.02 |
| Example 5-2 |  | 2 | 93 | 1.02 |
| Example 5-3 |  | 8 | 92 | 1.02 |
| Example 2-6 | Calcium fluoride | — | 90 | 1.07 |
| Example 5-4 |  | 4 | 95 | 1.02 |
| Example 5-5 |  | 2 | 94 | 1.02 |
| Example 5-6 |  | 8 | 94 | 1.02 |

|  | Fluoride | Number of second layers | Capacity retention ratio (%) | Expansion ratio (times) |
|---|---|---|---|---|
| Example 1-2 | Lithium fluoride | — | 89 | 1.09 |
| Example 6-1 |  | 4 | 93.6 | 1.02 |
| Example 6-2 |  | 2 | 92.8 | 1.03 |
| Example 6-3 |  | 8 | 92 | 1.02 |
| Example 2-6 | Calcium fluoride | — | 90 | 1.07 |
| Example 6-4 |  | 4 | 94.5 | 1.03 |
| Example 6-5 |  | 2 | 93.2 | 1.03 |
| Example 6-6 |  | 8 | 93.6 | 1.02 |

As shown in Tables 6 and 7, according to Examples 5-1 to 5-6 and 6-1 to 6-6, the capacity retention ratio was further improved and the expansion ratio was smaller than Examples 1-2 and 2-6. That is, it was found that the anode active material layer 23B more preferably had the second layer with the larger oxygen content.

Examples 7-1 to 7-20

Secondary batteries were assembled in the same manner as in Example 1-2 or Example 2-6, except that when the anode active material layer 23B was formed, oxygen was added by continuously introducing oxygen gas. The introducing amount of the oxygen gas was adjusted to change the oxygen content. In Examples 7-1 to 7-10, lithium fluoride was used as the fluoride. In Examples 7-11 to 7-20, calcium fluoride was used as the fluoride. For the formed anode 23 of Examples 7-1 to 7-20, the fluoride content and the oxygen content were examined in the same manner as in Examples 1-2 and 2-6. In the result, in Examples 7-1 to 7-10, the total abundance of lithium and fluorine was about 6.5 atomic %. In Examples 7-11 to 7-20, the total abundance of calcium and fluorine was about 15.3 atomic %. The oxygen content was as shown in Table 8.

Further, for the fabricated secondary batteries of Examples 7-1 to 7-20, charge and discharge were performed in the same manner as in Examples 1-2 and 2-6, and the capacity retention ratio and the battery expansion ratio were examined. The obtained results are shown in Table 8 together with the results of Examples 1-2 and 2-6.

TABLE 8

| | Anode active material layer | | Capacity | |
|---|---|---|---|---|
| | Fluoride | Oxygen content (atomic %) | retention ratio (%) | Expansion ratio (times) |
| Example 1-2 | Lithium fluoride | — | 89 | 1.09 |
| Example 7-1 |  | 1 | 89.2 | 1.08 |
| Example 7-2 |  | 2 | 89.5 | 1.085 |
| Example 7-3 |  | 3 | 92.1 | 1.052 |
| Example 7-4 |  | 5 | 92.2 | 1.048 |
| Example 7-5 |  | 15 | 92.4 | 1.04 |
| Example 7-6 |  | 25 | 92.6 | 1.03 |
| Example 7-7 |  | 35 | 92.4 | 1.03 |
| Example 7-8 |  | 40 | 92 | 1.02 |
| Example 7-9 |  | 50 | 89.2 | 1.02 |
| Example 7-10 |  | 60 | 89.1 | 1.01 |
| Example 2-6 | Calcium fluoride | — | 90 | 1.07 |
| Example 7-11 |  | 1 | 90.1 | 1.07 |
| Example 7-12 |  | 2 | 90.3 | 1.072 |
| Example 7-13 |  | 3 | 92.2 | 1.05 |
| Example 7-14 |  | 5 | 93.4 | 1.04 |
| Example 7-15 |  | 15 | 93.6 | 1.03 |
| Example 7-16 |  | 25 | 93.7 | 1.02 |
| Example 7-17 |  | 35 | 93.1 | 1.02 |
| Example 7-18 |  | 40 | 92.4 | 1.02 |
| Example 7-19 |  | 50 | 90.1 | 1.02 |
| Example 7-20 |  | 60 | 90 | 1.01 |

As shown in Table 8, according to Examples 7-1 to 7-20, the capacity retention ratio was further improved and the expansion ratio was smaller than Examples 1-2 and 2-6. That is, it was found that the anode active material layer 23B more preferably contained oxygen as an element. Further, there was a tendency that when the oxygen content was increased, the expansion ratio became smaller, while the capacity retention ratio was once increased and then decreased. That is, it was found that the oxygen content in the anode active material layer 23B was preferably within the range from 3 atomic % to 40 atomic %.

Examples 8-1 to 8-12

Secondary batteries were assembled in the same manner as in Example 1-2, except that when the anode active material layer 23B was formed, oxygen was added by introducing oxygen gas, and iron, nickel, titanium, or cobalt were co-deposited. At that time, lithium fluoride was used as the fluoride, and the introducing amount of the oxygen gas was constant in Examples 8-1 to 8-12. As a metal element, iron was used in Examples 8-1 to 8-9, nickel was used in Example 8-10, titanium was used in Example 8-11, and cobalt was used in Example 8-12. The deposition amount of the metal element was changed in Examples 8-1 to 8-9. For the formed anode 23 of Examples 8-1 to 8-12, the fluoride content, the oxygen content, and the content of metal element were examined in the same manner as in Example 1-2. In the result, in all cases, the total abundance of lithium and fluorine was about 6.5 atomic % and the oxygen content was about 5 atomic %. The content of metal element was as shown in Table 9.

Further, for the fabricated secondary batteries of Examples 8-1 to 8-12, charge and discharge were performed in the same manner as in Example 1-2, and the capacity retention ratio and the battery expansion ratio were examined. The obtained results are shown in Table 9 together with the results of Examples 1-2 and 7-4.

TABLE 9

| | | Anode active material layer | | | Capacity retention ratio (%) | Expansion ratio (times) |
|---|---|---|---|---|---|---|
| | Fluoride | Oxygen content (atomic %) | Metal element Kind | Content (atomic %) | | |
| Example 1-2 | Lithium | — | — | — | 89 | 1.09 |
| Example 7-4 | fluoride | 5 | — | — | 92.2 | 1.048 |
| Example 8-1 | | 5 | Fe | 0.2 | 92.8 | 1.03 |
| Example 8-2 | | | | 0.5 | 93 | 1.028 |
| Example 8-3 | | | | 1 | 93.5 | 1.027 |
| Example 8-4 | | | | 3 | 94 | 1.024 |
| Example 8-5 | | | | 5 | 94.5 | 1.01 |
| Example 8-6 | | | | 10 | 94.6 | 1.009 |
| Example 8-7 | | | | 20 | 94.5 | 1.008 |
| Example 8-8 | | | | 30 | 94.5 | 1.007 |
| Example 8-9 | | | | 40 | 95 | 1.006 |
| Example 8-10 | | 5 | Ni | 5 | 94.1 | 1.015 |
| Example 8-11 | | 5 | Ti | 5 | 94.5 | 1.011 |
| Example 8-12 | | 5 | Co | 5 | 94.6 | 1.01 |

As shown in Table 9, according to Examples 8-1 to 8-12, the capacity retention ratio was further improved and the expansion ratio was smaller than Examples 1-2 and 7-4. That is, it was found that the anode active material layer 23B more preferably contained the metal element of iron, nickel, titanium, or cobalt as an element.

The invention has been described with reference to the embodiments and the examples. However, the invention is not limited to the foregoing embodiments and the foregoing examples, and various modifications may be made. For example, in the foregoing embodiments and the foregoing examples, descriptions have been given of the case using the electrolytic solution as a liquid electrolyte or the so-called gelatinous electrolyte. However, other electrolyte may be used. As other electrolyte, a solid electrolyte having ion conductivity, a mixture of a solid electrolyte and an electrolytic solution, or a mixture of a solid electrolyte and a gelatinous electrolyte can be cited.

As a solid electrolyte, for example, a polymer solid electrolyte in which an electrolyte salt is dispersed in a polymer having ion conductivity, or an inorganic solid electrolyte formed of ion conductive glass, ionic crystal or the like can be used. As a polymer of the polymer solid electrolyte, for example, an ether polymer such as polyethylene oxide and a cross-linked body containing polyethylene oxide, an ester polymer such as poly methacrylate, or an acrylate polymer can be used singly, by mixing, or by copolymerization. As an inorganic solid electrolyte, a substance containing lithium nitride, lithium phosphate or the like can be used.

Further, in the foregoing embodiments and the foregoing examples, descriptions have been given of the coin type secondary battery and the spirally wound laminated type secondary battery. However, the invention can be similarly applied to a secondary battery having other shape such as a cylinder type secondary battery, a square type secondary battery, a button type secondary battery, a thin secondary battery, a large secondary battery, and a laminated type secondary battery. Further, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
a cathode;
an anode; and
an electrolyte,
wherein,
the anode comprises an anode active material layer, and
the anode active material layer comprises silicon and a fluoride of an alkali metal, where a content of the fluoride is in an amount from 1 atomic % to 40 atomic %, inclusive, as a total amount of the alkali metal and fluorine, the fluoride of the alkali metal being in the anode active material layer.

2. The battery according to claim 1, wherein the fluoride includes at least one selected from the group consisting of lithium fluoride, sodium fluoride and potassium fluoride.

3. The battery according to claim 1, wherein the anode active material layer has an active material particle comprising silicon as an element, and at least part of the active material particle comprises the fluoride in the particle.

4. The battery according to claim 1, wherein the anode includes an anode current collector, and the anode active material layer is alloyed with the anode current collector at least in part.

5. The battery according to claim 1, wherein the anode active material layer further comprises at least one metal element selected from the group consisting of iron (Fe), cobalt (Co), nickel (Ni), and titanium (Ti).

6. The battery according to claim 5, wherein a content of the metal element in the anode active material layer is from 0.5 atomic % to 30 atomic %.

7. The battery according to claim 1, wherein the anode includes an anode current collector, and a surface roughness of the anode current collector is 0.1 μm or more in units of an Ra value.

8. The battery according to claim 3, wherein the anode active material particles form a plurality of secondary particles, and the secondary particles are separated by a groove.

9. The battery according to claim 1 is a coin type battery, a spirally wound laminated type battery, a cylinder type battery, a square type battery, a button type battery, a thin type battery or a laminated type battery.

10. A battery comprising:
a cathode;
an anode; and
an electrolyte,
wherein,
the anode comprises an anode active material layer,
the anode active material layer comprises silicon and a fluoride of an alkali earth metal, where a content of the fluoride is in an amount from 0.5 atomic % to 30 atomic %, inclusive, as a total amount of the alkali earth metal and fluorine, the fluoride of the alkali earth metal being in the anode active material layer.

11. The battery according to claim 10, wherein the fluoride includes at least one selected from the group consisting of magnesium fluoride, calcium fluoride and strontium fluoride and barium fluoride.

12. The battery according to claim 10, wherein the anode includes an anode current collector, and the anode active material layer is alloyed with the anode current collector at least in part.

13. The battery according to claim 10, wherein the anode active material layer further comprises at least one metal element selected from the group consisting of iron (Fe), cobalt (Co), nickel (Ni), and titanium (Ti).

14. The battery according to claim 13, wherein a content of the metal element in the anode active material layer is from 0.5 atomic % to 30 atomic %.

15. The battery according to claim 10, wherein the anode includes an anode current collector, and a surface roughness of the anode current collector is 0.1 μm or more in units of an Ra value.

16. The battery according to claim 10 is a coin type battery, a spirally wound laminated type battery, a cylinder type battery, a square type battery, a button type battery, a thin type battery or a laminated type battery.

17. An anode active material comprising silicon and a fluoride of an alkali metal, where a content of the fluoride is in an amount from 1 atomic % to 40 atomic %, inclusive, as a total abundance of the alkali metal and fluorine.

18. The anode active material according to claim 17, wherein the fluoride includes at least one selected from the group consisting of lithium fluoride, sodium fluoride and potassium fluoride.

19. An anode active material comprising silicon and a fluoride of an alkali earth metal, where a content of the fluoride is in an amount from 0.5 atomic % to 30 atomic %, inclusive, as a total abundance of the alkali earth metal and fluorine.

20. The anode active material according to claim 19, wherein the fluoride includes at least one selected from the group consisting of magnesium fluoride, calcium fluoride and strontium fluoride and barium fluoride.

* * * * *